(12) United States Patent
Penny et al.

(10) Patent No.: US 6,579,908 B1
(45) Date of Patent: Jun. 17, 2003

(54) FOAM CONTROL AGENTS FOR COATINGS

(75) Inventors: Thomas J. Penny, Newton, NJ (US);
Andrew A. Romano, Sparta, NJ (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 10/100,528

(22) Filed: Mar. 18, 2002

(51) Int. Cl.⁷ .................. B01D 19/04; C08L 83/12; C08K 5/20; C08K 5/09
(52) U.S. Cl. .................. 516/31; 516/118; 516/131; 524/261; 524/265; 524/322
(58) Field of Search .............. 516/31, 118, 124, 516/131; 524/322, 261, 265

(56) References Cited

U.S. PATENT DOCUMENTS

| | | | |
|---|---|---|---|
| 3,562,786 A | | 2/1971 | Bailey et al. .................. 516/18 |
| 4,225,456 A | * | 9/1980 | Schmidt et al. .............. 516/121 |
| 4,514,319 A | * | 4/1985 | Kulkarni et al. ............. 516/117 |
| 5,510,409 A | * | 4/1996 | Romano ...................... 524/322 |
| 5,534,609 A | | 7/1996 | Lewis et al. ................... 528/15 |
| 5,558,806 A | | 9/1996 | Policello et al. ............. 516/204 |
| 5,804,099 A | * | 9/1998 | Heilen et al. ................ 516/124 |
| 6,426,379 B1 | * | 7/2002 | Rudy et al. .................. 516/118 |

FOREIGN PATENT DOCUMENTS

CA     2 351 122     * 12/2001

\* cited by examiner

Primary Examiner—Daniel S. Metzmaier
(74) Attorney, Agent, or Firm—David L. Hedden

(57) ABSTRACT

This invention relates to foam control agents for paints and coatings comprising a (a) a siloxane polyalkyleneoxide copolymer, (b) N,N'-ethylene bisstearamide, and (c) a carrier.

5 Claims, No Drawings

FOAM CONTROL AGENTS FOR COATINGS

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION (1) Field of the Invention

This invention relates to foam control agents for paints and coatings comprising a (a) a siloxane polyalkyleneoxide copolymer, (b) N,N'-ethylene bisstearamide, and (c) a carrier.

(2) Description of the Related Art

A foam control agent is often essential to coatings, particularly latex emulsions. For purposes of describing this invention, "coatings" shall include "paints". Without the foam control agent, bubbles will form in the coating. When the coating is applied to the substrate, the bubbles will dry on the substrate. These dried bubbles are not aesthetically pleasing. Furthermore, a substrate with dried bubbles is not effectively covered and protected from the environment.

There are many foam control agents for coatings currently available. Foam control agents typically consist of a hydrophobic material dispersed in a carrier, e.g. mineral oil, an alcohol, water, or other liquid. Typically, the hydrophobic material is a wax or silicone.

Typically, wax-based foam control agents are not as effective as silicone based products. Additionally, wax-based foam control agents tend to cause diminished specular gloss, which causes the coating to look duller than intended. On the other hand, silicone-based foam control agents are very effective at controlling foam, but often are difficult to incorporate into a coating. Surface defects, such as a "ripple", or "orange peel effect" and "pitting" are typical defects seen with silicone-based foam control agents. Because of this, it is necessary to add of the "dry" components of the paint formulations with some liquid to make a slurry before the remaining "wet" components. The components, including the silicone defoamer, are then subjected to high agitation ("grind phase"), which aids in the incorporation of a silicone defoamer.

The problem is that the "grind phase" takes time, additional processing and additional energy to carry out. Therefore, there is an interest in reducing and/or eliminating the "grind phase" without causing surface defects, such as a "ripple", or "orange peel effect" and "pitting".

All citations referred to under this description of the "Related Art" and in the "Detailed Description of the Invention" are expressly incorporated by reference.

BRIEF SUMMARY OF THE INVENTION

The subject invention relates to foam control agents for paints and coatings comprising:

(a) a siloxane polyalkyleneoxide copolymer,
(b) N,N'-ethylene bisstearamide, and
(c) a carrier.

The weight ratio of (a) to (b) is typically from 30:100 to 70:100, preferably from 50:100.

The use of these foam control agents is more effective as foam control agents than commercially available wax-based or silicone-base foam control agents. However, the gloss of coatings containing the foam control agents is equal to or better than the gloss of paints and coatings formulated with wax-based or silicone-base foam control agents. The invention eliminates these defects. The invention also relates to a method of formulating a coating, wherein the silicone-based foam control agent is added to the coating after the other solids and liquids are mixed without the requirement of "grind phase".

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode. It is contemplated that many equivalent embodiments of the invention will be operable besides these specifically disclosed.

A broad range of water immiscible fluids can be used as the carrier. These include normally liquid hydrocarbons, polypropylene glycol, and vegetable oils. Preferably used are normally liquid hydrocarbons such as tetradecane, isooctane, hexadecane mineral oil, and kerosene. The hydrocarbon carrier generally has a pour point in the range of about −40° C. to −10°C.

A variety of siloxanes can be used in the composition, including straight chain and branched silicones. For instance, linear polysiloxane having repeating internal siloxane moieties and an end blocked polypropylene oxide moiety, and those siloxanes described in U.S. Pat. No. 3,562,786 having a pendant polyoxyalkylene group containing both polyoxyethylene and polyoxypropylene moieties. Polysiloxanes containing pendant polyoxypropylene moieties bonded to a dimethylsiloxane moiety can also be used, for instance, see U.S. Pat. Nos. 5,558,806 and 5,534,609. However, the preferred siloxanes are siloxane polyalkyleneoxide copolymers represented by the following structural formula:

$$(CH_3)_3-Si-\left[O-\underset{\underset{CH_3}{|}}{\overset{\overset{CH_3}{|}}{Si}}\right]_x-\left[O-\underset{\underset{CH_2CH_2CH_2-(OCH_2CH_2)_n-OH}{|}}{\overset{\overset{CH_3}{|}}{Si}}\right]_y-O-Si(CH_3)_3$$
$$|$$
$$CH_3$$

where x is from about 50 to about 80, y is from about 7 to about 9, and n is from about 8 to 15, most preferably where x=about 65, y=about 8, and n=about 12.

Optional components of the foam control agent include sorbitan tristearate, waxes, surfactants, fatty acid esters, and end capped propylene oxide and/or butylene oxide polymers.

The amounts of the components used to make the foam control agent are as follows, where said weight percents are based upon the total weight of foam control agent:

(a) from 1 to 20 weight percent of a siloxane, preferably 1 to 10, more preferably 2 to 7 weight percent;

(b) from 1 to 15 weight percent of ethylene bis stearamide, preferably 1 to 10, more preferably 2 to 8 weight percent; and (c) from 65 to 98 weight percent of a hydrocarbon carrier, preferably 75 to 95, more preferably 80 to 90 weight percent.

The foam control agents can be stored at temperatures of 0° C. to 40° C. for several months (typically up to six or even twelve months) before using them without a phase separation. They are typically mixed coatings (for purposes of describing this invention, "coating" includes "paints"), preferably latex emulsions, in amounts of 0.01 to 2.0 part by weight based upon the weight of the latex emulsion, preferably from 0.2 to 0.8 part by weight.

Such formulated paints and coatings may include one or more of the following components in a addition to a foam control agent: (1) 5.0 to 25.0 parts by weight of a latex emulsion (2) 20.0 to 60.0 parts by weight of water; (3) 1.0 to 40 parts by weight of a pigment; (4) 1.0 to 10.0 parts by weight of a polymeric binder; (5) 1.0 to 10 parts by weight of a coalescing aid; (6) 1.0 to 10.0 parts by weight of a thickener; (7) 0.1 to 2.0 parts by weight of a dispersant; (8) 0.01 to 1.0 part by weight of a biocide; (9) 5.0 to 40.0 parts by weight of an extender pigment; (10) 1.0 to 5.0 parts by weight of a rheology modifier; (11) 1.0 to 5.0 parts by weight of a glycol, e.g. propylene glycol; (12) 0.1 to 2.0 parts by weight of a surfactant; and (13) 0.01 to 2.0 parts by weight of a base, e.g. ammonium hydroxide.

Abbreviations

The following abbreviations are used:

CARRIER paraffin oil having a viscosity of 100 SUS.

EBS Acrawax C-DF-1, ethylene bis stearamide, manufactured by Lonza.

POEOA polyoxyethylene ester of oleic acid having a polyoxethylene molecular weight of 600.

SC Silwet L-7510, manufactured by OSI, a silicone copolymer with polypropylene oxide, as shown in structural formula I.

SO silicone oil, manufactured by Dow Corning.

SS standard silica-based foam control agent, manufactured by Ashland Specialty Chemical, Drew Industrial Division.

SW standard wax-based foam control agent, manufactured by Ashland Specialty Chemical, Drew Industrial Division.

SSW standard silica-wax-based foam control agent, manufactured by Cognis Corporation.

EXAMPLE

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application, all units are in the metric system and all amounts and percentages are by weight, unless otherwise expressly indicated.

Example 1

Preparation of Foam Control Agent

A foam control agent was prepared by mixing the components set forth in Table I. Approximately one-half of the carrier was heated, then the one-half of the EBS was added. The second half of each component was added in the same order, followed by the SO. The POEOA was added next and finally the SC. The additions occurred under high agitation.

TABLE I

| Component | Amount (pbw) |
| --- | --- |
| CARRIER | 88.8 |
| EBS | 5.0 |
| SO | 0.2 |
| POEOA | 4.0 |
| SC | 2.0 |
| Total | 100.0 |

The foam control agent was evaluated in an exterior and interior paint formulations and compared to commercially available silicone-based, wax-based, and wax-silicone-based foam control agents. The foam control agent was added to the coating after the other solids and liquid components of the coating were mixed. The results are set forth in Tables II and III.

The "bubble break" time of the paint was measured to evaluate the effectiveness of the foam control agents as foam control agents. The "bubble break" time is the time it takes for a bubble to break after paint application by roller. After a bubble appears, the amount of time for it to break is measured. If the time is less, this indicates that the foam control agent is more effective at controlling foam. Drawdowns of the paint were also taken to measure gloss and other surface characteristics. These tests are more thoroughly described as follows:

Bubble Break

Bubble break was measured by rolling a coating formulation containing the foam control agent onto Sherwin Williams type paper using a 3" roller having a ⅜" nap. After uniformly rolling the coating onto the paper, the time for all the formed bubbles to break was measured, up to 5 minutes. The dry and wet film appearances were also noted.

Drawdown

Films for drawdowns were prepared by pulling the coating with a 3 millimeter Bird blade on a Form 1B Penoopac Leneta chart and then observing film defects.

Gloss

Gloss was measured on film drawdown after drying for minimum of 16 hours at a 60° angle using BYK-Gardner Mciro-TRI-Glossmeter. Higher readings mean higher gloss. The addition of the foam control agent actually has an adverse effect on gloss. Therefore, the interest of the formulator is in reducing foaming, but doing this in a manner that has the least adverse impact on gloss.

TABLE II (Test results using an exterior semi-gloss paint)

| Foam Control Agent | Dose | Bubble Break Time (Sec) | Draw-down | 60° Gloss | Aged Bubble Break Time (Sec) | Aged 60° Gloss | Draw-down |
|---|---|---|---|---|---|---|---|
| Blank | 0.0% | >180 | Clear | 38.5 | >180s | 38.5 | Clear |
| 1 | 0.4% | 30 | Clear | 37.2 | 30s | 37.0 | Clear |
| SSW | 0.92% | 45 | Clear | 34.5 | 30s | 33.5 | Clear |
| SS | 0.4% | >180 | Clear | 36.8 | 60s | 37.2 | Clear |
| SW | 0.4% | >180 | Clear | 35.7 | 75s | 35.1 | Clear |

TABLE III (Test results using an interior semi-gloss paint)

| Foam Control Agent | Dose | Bubble Break Time (Sec) | Draw-down | 60° Gloss | Aged Bubble Break Time (Sec) | Aged 60° Gloss | Draw-down |
|---|---|---|---|---|---|---|---|
| Blank | 0.0% | >180 | Clear | 53.1 | >180s | 53.1 | Clear |
| 1 | 0.4% | 30 | Clear | 49.1 | 30s | 43.6 | Clear |
| SSW | 0.63% | 45 | Clear | 46.9 | 45s | 40.7 | Clear |
| SS | 0.4% | 30 | Clear | 49.2 | 45s | 44.0 | Clear |
| SW | 0.4% | 45 | Clear | 46.1 | 60s | 42.9 | Clear |

The results show that the foam control agent of this invention is a superior foam control agent, as evidenced by the Bubble Break Test, and gloss is not adversely affected. In some cases there is an even higher gloss when the foam control agent of this invention is used instead of the silicone-based, wax-based, and wax-silicone-based foam control agents.

We claim:

1. A foam control agent for coatings comprising comprising:
   (a) from 1 to 20 weight percent of a siloxane polyalkyleneoxide copolymer having the following structural formula,

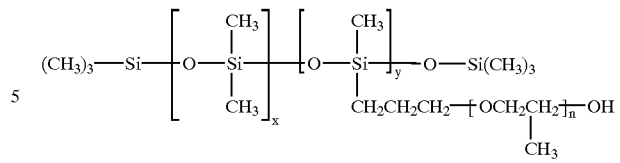

where x is from about 50 to about 80, y is from about 7 to about 9, and n is from about 8 to 15,
   (b) from 1 to 15 weight percent of ethylene bis stearamide, and
   (c) from 65 to 98 weight percent of a liquid hydrocarbon carrier,
   wherein said weight percents are based upon the total weight of the foam control agent.

2. The foam control agent of claim 1 which further comprises a polyoxyethylene ester of oleic acid.

3. The foam control agent of claim 2, which comprises:
   (a) from 2 to 7 weight percent of siloxane;
   (b) from 2 to 8 weight percent of ethylene bis stearamide;
   (c) from 80 to 90 weight percent of hydrocarbon carrier; and
   (d) from 2 to 5 weight percent of a polyoxyethylene ester of oleic acid,
   where said weight percents are based upon the total weight of the foam control agent.

4. The foam control agent of claim 1 wherein x=about 65, y=about 8, and n=about 12.

5. A method of formulating a coating containing a foam control agent comprising:
   (a) mixing the solid and liquid components of a coating, except the foam control agent; and
   (b) then adding an effective foam controlling amount of a foam control agent of claims 1, 2, 3, or 4.

* * * * *